United States Patent Office 3,435,125
Patented Mar. 25, 1969

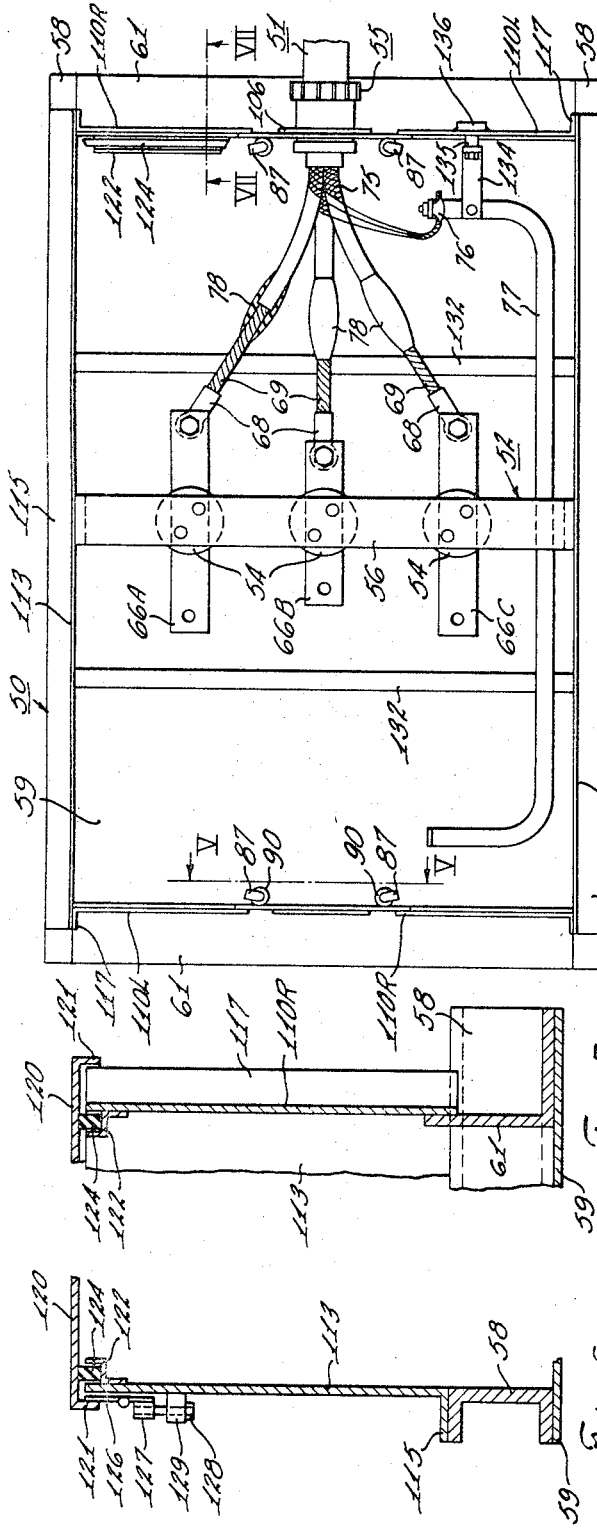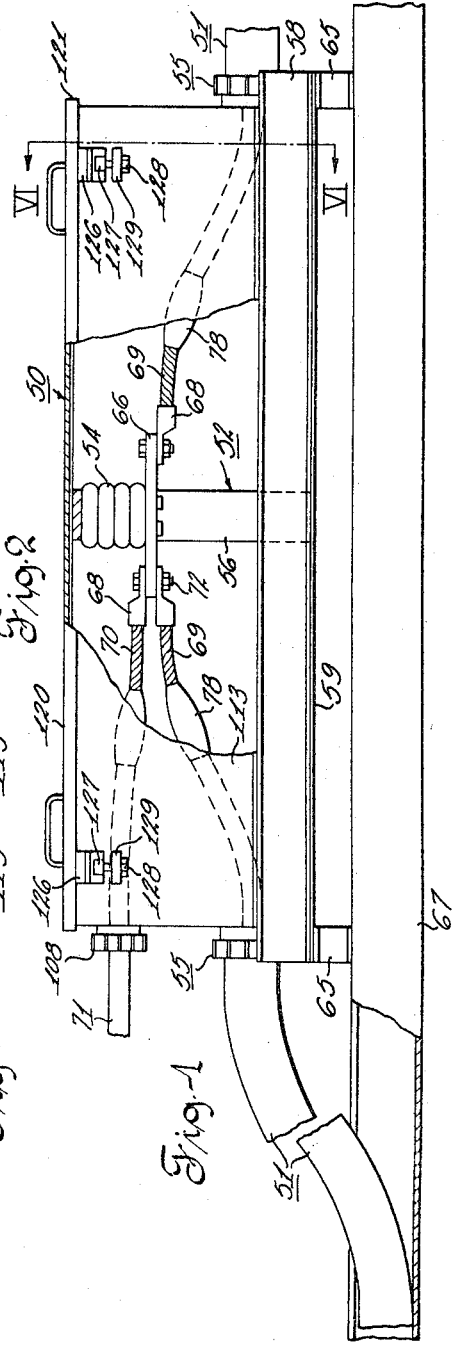

3,435,125
T-JUNCTION BOX FOR THREE PHASE PRIMARY
FEEDER CABLE
Thomas H. Keogh, Pittsburgh, and Norman E. Haglund, Gibsonia, Pa., assignor to Allis-Chalmers Manufacturing Company, Milwaukee, Wis.
Filed Oct. 5, 1967, Ser. No. 673,148
Int. Cl. H01r 13/46; H02g 5/06
U.S. Cl. 174—59   7 Claims

ABSTRACT OF THE DISCLOSURE

A T-junction box for tapping a three phase electrical power primary feeder cable has a rigid framework including a pair of elongated side frame members secured to the bottom panel of the junction box, an inverted U-shaped support secured adjacent its ends at the center of the side frame members, a pair of end frame members secured to the side frame members and having arcuate cutout portions partially defining cable entrance ports at opposite ends of the junction box, and standoff insulators depending from the crosspiece of the inverted U-shape support and carrying terminals for the phase conductors of the primary and tap cables. End plate members cooperate with the end frame members to form the cable entrance ports and the end plate members and side panels of the junction box are detachable to make all points within the junction box readily accessible.

This invention relates to electrical power transmission and distribution and in particular to junction boxes for making taps, or T-junctions, in three phase, high voltage primary feeder cable to centers of load.

Combinations of transformers and factory-assembled switchgear termed unit substations, or load centers, are often utilized to supply electric power at centers of load from high voltage sources stepped down to distribution voltage or to service voltage. Such power centers often supply secondary distribution at 2300 or 4000 volts from 15,000 volt or higher potential primary and may also supply concentrated centers of load with power at service voltage such as 440 volts. The high voltage, three phase power primary feeder cables are of heavy conductor, for example, 500,000 circular mils, and are laid in cable trays, and T-junction boxes are provided to tap the primary feeder cable run for a power center. Known three phase primary cable junction boxes mount post type standoff insulators for supporting the cable conductors on the junction box walls and also support the cable terminations at the cable entrance ports on the junction box walls, and consequently the walls of the junction box must be of sufficient mechanical strength and of sufficiently heavy gauge to withstand the mechanical forces resulting from "whipping" of the cable conductor ends under short circuit conditions. Known primary cable junction boxes are of such heavy gauge material that their weight is too great to permit mounting on an overhead aluminum cable tray. Further, only the cover can be removed from known three phase, primary feeder cable junction boxes, and consequently the operation of inserting the heavy and large diameter three phase cable through the entrance ports of known primary cable junction boxes is difficult, and the cable terminators at the cable entrance ports are at inaccessible locations within the junction box. Other known three phase primary feeder cable junction boxes are filled with an insulating gas such as nitrogen and utilize two sets of standoff insulators which undesirably increases both cost and size.

It is an object of the invention to provide an improved T-junction box for a three phase high potential primary feeder cable which is substantially lighter in weight and smaller in size than known apparatus. A further object is to provide such a junction box which is sufficiently light in weight to permit mounting on an overhead aluminum tray for the primary feeder cable and which is adjustable to permit mounting on any standard width of cable tray.

Another object of the invention is to provide such an improved primary cable junction box which facilitates laying the cable in the entrance ports and wherein the cable terminations at the entrance ports and all points within the junction box where the worker must make connections are readily accessible.

These and other objects and advantages of the invention will be more readily apparent from the following detailed description when read in conjunction with the accompanying drawing wherein:

FIG. 1 is a front view of a T-junction box embodying the invention mounted on a primary feeder cable tray and with a portion of the front wall broken away to illustrate the internal construction;

FIG. 2 is a plan view of the junction box of FIG. 1 with the cover removed and with the primary feeder cable shown in only the right half of the junction box;

FIG. 6 is a view taken along line VI—VI of FIG. 1 with the cover in place; and

FIG. 7 is a view taken along line VII—VII of FIG. 2 with the cover in place.

Figure 3:
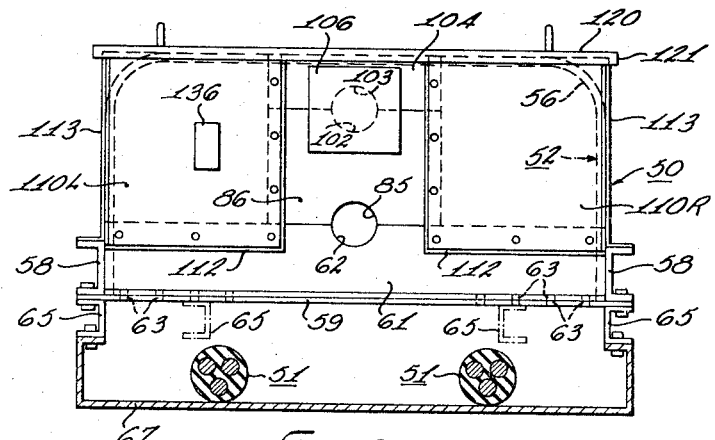
FIG. 3 is an end view of the junction box of FIG. 1 with the cable and cable terminator omitted.

Referring to the drawing, a T-junction box 50 embodying the invention may provide a through connection and a tap leading to a primary feeder breaker for a three phase primary feeder cable 51 such as a 15 kilovolt, 500,000 circular mil cable. Junction box 50 provides high mechanical strength and light weight by supporting the post standoff insulators 54 and the cable terminators 55 at the cable entrance ports (as well as the side and end wall and cover members of the junction box) on a skeletal framework 52. The framework 52 includes an inverted U-shaped member 56, which may be of ½ inch steel, welded at its ends to the web and at the center of a pair of horizontally spaced, channel iron side frame members 58 which are affixed along their entire length by welds to the relatively thin gauge steel bottom member 59 of the junction box 50. The channel side frame members 58 define a portion of the junction box side walls and are affixed at their ends by welds to angle cross section end members 61 which are welded to the bottom member 59 of the junction box 50 and increase the mechanical strength of the skeletal framework 52. Arcuate cutout portions 62 at the centers of the end member 61 partially define the cable entrance ports for the three phase primary cable 51 and receive the cable terminators 55.

The bottom member 59 of the junction box 50 extends beyond the end members 61 and has a plurality of pairs of threaded bolt receiving holes 63 spaced corresponding to standard widths of cable trays (for example, on 16", 20", 24" and 30" centers) and which are adapted to receive bolts that secure channel-shaped feet 65 to junction box 50. The lower flanges of the channel-shaped feet 65 are affixed to the horizontal flanges at the upper ends of the cable tray 67 and support junction box 50 on cable tray 67. An alternative position of the feet 65 wherein the bolts are secured within a different pair of threaded holes 63 to permit mounting on a different width cable tray is illustrated in dot-dash lines in FIG. 3.

Three depending, horizontally spaced standoff insulators 54 are supported by bolts from the inverted U-shaped frame member 56. Each insulator 54 supports an elongated copper terminal bar 66 extending longitudinally of junction box 50. Eye type connectors 68 having tubular portions receiving and crimped to the conductors 69 of the primary feeder cable 51 are disposed against the lower surface of the terminal bars 66; similar eye type connectors 68 having tubular portions receiving and crimped to the conductors 70 of the three phase tap cable 71 are disposed against the upper surface of the copper terminal bars 66, and bolt means 72 extend through clearance holes in the eye connectors 68 and terminal bars 66 to rigidly secure them together. All of the cable conductors 69 are preferably of the same length, and the outer terminal bars 66A and 66C are longer than the center terminal bar 66B to compensate for the fanning out of the cable conductors 69. Three phase tap cable 71 preferably has phase conductors of 4/0 A.W.G. size.

The T-junction box of the invention will receive any type of primary cable regardless of its type of shielding and grounding. In the embodiment illustrated in the drawing primary feeder cable 51 may have three phase conductors 69 individually covered with a layer of suitable insulation 73 which is surrounded by a jacket of semiconductive material 74, and the insulation 73 and the semiconductive material 74 are preferably cut back approximately 15 inches from the terminal 66 to provide adequate creep distance. The edge of the semiconductive layer 74 is the point of highest potential stress where the lines of potential force concentrate. Such edge and the portion of the cable conductor for several inches on both sides of such edge are preferably covered with a coating 78 of moldable semiconductive material commercially available under the trade name "Airseal" to distribute the equipotential lines in a direction longitudinally of the cable conductor 69 and thus decrease the potential gradient at the edge of the semiconductive material layer 74.

The cable insulation 73 surrounded by the semiconductive layer 74 of the three phase conductors 69 of primary feeder cable 51 may be covered by metallic grounding sheaths 75, and the grounding sheaths 75 of the three conductors 69 are clamped together and grounded by a clamp type connector 76 on an elongated copper ground bar 77 disposed adjacent the bottom of junction box 50. The three conductors 69 with concentric layers of insulation 73, semiconductive material 74 and grounding sheaths 75 are enclosed within galvanized steel interlocked cable armor 79 which, in turn, is surrounded by a watertight outer jacket 80 of suitable insulating material such as polyvinyl chloride. Primary feeder cable 51 may have a jute filler.

Figure 5:
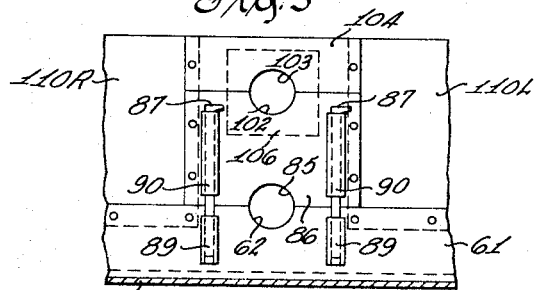
FIG. 5 is a view taken along line V—V of FIG. 2.
Figure 4:
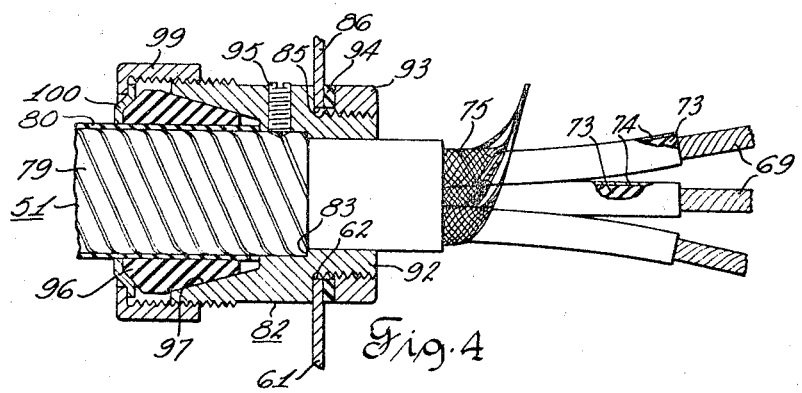
FIG. 4 is a cross sectional view through the cable terminator and three phase primary feeder cable at the entrance port to the junction box of FIGS. 1–3.

A tubular metallic terminator body 82 fits over primary feeder cable 51 and has a radially extending internal shoulder 83 against which the end of cable armor 79 abuts. The circular port for entrance cable 51 into junction box 50 is defined by the arcuate cutout portion 62 of an end member 61 and by a corresponding arcuate cutout portion 85 in a removable end plate 86 disposed above end member 61 and affixed thereto by vertical pins 87 (see FIG. 5) extending through aligned pipe sections 89 and 90 secured to the interior surfaces of end member 61 and end plate 86 respectively. A threaded reduced diameter portion 92 of terminator body 82 extends through the cable entrance port defined by arcuate cutout portions 62 and 85, and a nut 93 threaded on portion 92 compresses a resilient gasket 94 against end members 61 and 86 to secure cable terminator 55 to junction box 50 with an air tight seal. A metallic grounding set screw 95 tightened within a threaded hole in terminator body 82 engages cable armor 79 and grounds it. A conical sealing bushing 96 of suitable compressible material such as neoprene rubber surrounds cable armor 79 and fits within a complementary conical opening 97 in the internal circumferential surface of the larger diameter portion of terminator body 82. A pressure bushing nut 99 engaging the external threads on the larger diameter portion of terminator body 82 has a radially inward extending portion which overlies a pressure ring 100 surrounding cable armor 79 and actuates pressure ring 100 in an axial direction when pressure nut 99 is tightened to compress the conical sealing bushing 96 against the complementary conical surface 97 on terminator body 82 and thus hermetically seal the cable entrance into junction box 50.

It will be appreciated that primary feeder cable 51 may easily be inserted into arcuate cutout portion 62 (when end plate 86 is removed) by merely lifting the cable slightly and moving it across end member 61, and further it will be noted that end plate 86 can be placed in position to form the cable entrance port and the cable terminator 55 secured to the junction box when the junction box is without sidewall and end wall members, thereby making all portions of the interior of the junction box readily accessible to the workman.

An arcuate cutout portion 102 provided in the top edge of end plate 86 opposes a similar arcuate cutout portion 103 in an upper end plate 104 disposed above end plate 86. A metallic cover plate 106 may close the circular hole defined by arcuate cutout portions 102 and 103 and may be removably secured by screws to end plate 86 and upper end plate 104 and thus normally secure members 86 and 104 together. If tap cable 71 is to pass through the circular hole defined by arcuate cutout portions 102 and 103, a circular hole may be cut, by suitable means such as a welding torch, in cover plate 106 to form the entrance port for tap cable 71, the tap cable 71 may be inserted in cutout portion 102, the cover plate 106 having such circular hole formed therein slipped over tap cable 71, the upper end plate 104 positioned above end plate 86, and the cover plate 106 bolted to both end plates 86 and 104 to hold them in position. The terminator 108 for tap cable 71 is substantially identical to cable terminator 55 for primary feeder cable 51 and its description will not be repeated.

Detachable left and right hand end panels 110L and 110R are disposed at each end of junction box 50 above end member 61 and on opposite sides of end plates 86 and 104 so that they overlap these end members 61, 86 and 104, and may be affixed by bolts to the members 61, 86 and 104. Elongated gaskets 112 (see FIG. 3) of suitable compressible material are disposed between the overlapping adjacent edges of the left and right hand panels 110L and 110R with the end members 61, 86 and 104 to provide an airtight seal therebetween, and compressible gaskets (not shown) are provided between end members 61 and 86 and between end members 86 and 104.

Detachable side panels 113 having horizontal flanges 115 (see FIG. 6) at their lower edge are removably secured by screws to the upper flanges of the channel side frames 58 and to the turned over edges 117 (see FIG. 7) on the end panels 110L and 110R with elongated gaskets (not shown) of suitable compressible material clamped therebetween to provide an airtight seal at these points.

A cover 120 having a depending peripheral flange 121 closes the open end of junction box 50. Elongated L-shaped brackets 122 (see FIGS. 6 and 7) are secured, preferably by welding, to the inner surface adjacent the top edge of end panels 110 and side panels 113, and elongated gaskets 124 of suitable compressible material disposed in L-shaped brackets 122 extend above the end panels 110 and side panels 113 when cover 120 is removed. Depending hinges 126 are secured, preferably by welding, to the depending flange 121 on cover 120 at spaced apart points around the periphery of the cover 120, and cover pull down bars 127 secured to the lower member of each hinge 126 have downwardly facing tapped holes which are engaged by vertical bolts 128 extending through clearance holes in cover pull down brackets 129 welded to the side panels 113 beneath the hinge 126 on cover 120. Tightening of cover pull down bolts 128 within tapped holes in bars 127 affixed to hinges 126 draws the hinges 126 and cover 120 down toward junction box 50, thereby compressing the elongated gaskets 124 in L-shaped brackets 122 against the lower surface of cover 120 around the entire periphery of cover 120 and providing an airtight seal for junction box 50 at cover 120.

The U-shaped copper grounding bar 77 is elongated longitudinally of junction box 50 and supported on angle members 132 extending transversely of junction box 50 and secured by welding to bottom member 59. The clamp type connector 76 for the cable grounding sheaths 75 is disposed at one end of grounding bar 77, and a flexible copper strap 134 (see FIG. 2) may be connected at one end to grounding bar 77 and be affixed at the other end by bolts to tapped lugs 135 integral with and projecting horizontally from a grounding pad 136. The lugs 135 may protrude through an opening (not shown) in an end panel 110, and the grounding pad 136 may be secured to end panel 110 so that it covers said opening and the exterior surface thereof may be copper clad.

The disclosed junction box 50 has successfully withstood short circuit current of sixty thousand amperes for sixteen cycles without failure and has also successfully withstood industry standard impulse tests without failure.

While only a single embodiment of the invention has been illustrated and described, many modifications and variations thereof will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

1. In a T-junction box for a three phase, high potential cable having side, end, bottom and cover panels and gasketing means for providing an airtight seal at the adjacent edges of said panels, the improvement of a rigid framework including:
    a pair of elongated side frame members secured adjacent a pair of opposite edges of said bottom panel and detachably secured to said side panels,
    an inverted U-shaped support secured at its ends adjacent the center of said side frame members,
    a pair of elongated end frame members disposed adjacent the other pair of opposite edges of said bottom panel secured at their ends to said side frame members and also detachably secured to said end panels,
    three horizontally spaced depending standoff insulators secured to the crosspiece of said inverted U-shaped support, and
    metallic terminals for the conductors of said three phase cable at the lower end of said insulators.

2. In a T-junction box in accordance with claim 1 where said end frame members have arcuate cutout portions midway along the upper edge thereof and including a pair of elongated first end plate members disposed above said end frame members and having arcuate portions in their lower edge opposite said cutout portions in said end frame members and together therewith defining circular entrance ports for said cable at opposite ends of said junction box, and means for detachably securing said end plate members to said first end frame members and to said end panels.

3. In a T-junction box in accordance with claim 2 wherein said side and end and cover panels are removably secured on said junction box.

4. In a T-junction box in accordance with claim 2 wherein said first end plate members have arcuate cutout portions in the upper edge thereof and including a pair of second end plate members disposed above said first end plate members and having an arcuate cutout portion along the lower edge thereof opposite said arcuate cutout portion in the upper edge of said first end plate members and together therewith defining a circular opening for the tap cable in each end of the junction box, and a cover plate detachably secured to said first and second end plate members and closing said circular opening when no tap cable extends therethrough.

5. In a T-junction box in accordance with claim 3 and including an elongated copper grounding bar disposed within said junction box adjacent said bottom panel, a copper grounding pad on one of said end panels, and a copper flexible strap connecting said grounding pad to said grounding bar.

6. In a T-junction box in accordance with claim 2 wherein said metallic terminals are elongated copper bars extending longitudinally of said junction box.

7. A T-junction box for a three phase high potential cable comprising, in combination:
    a rigid framework including a rectangular metallic sheet forming the bottom member of said junction box,
    a pair of elongated structural iron side frame members secured adjacent a pair of opposite edges of said bottom sheet member,
    an inverted U-shaped support secured at its ends adjacent the center of said side frame members,
    a pair of elongated end frame members disposed adjacent the other pair of opposite edges of said sheet member, said side frame and end frame members being secured together at their adjacent ends and said end frame members having arcuate cutout portions midway and along the upper edge thereof,
    a pair of elongated end plate members disposed above said end frame members and having arcuate cutout portions in their lower edge opposite said cutout portions in said end frame members and together therewith forming circular entrance ports for said cable at opposite ends of said junction box,
    means for detachably affixing said end frame and end plate members together at each end of said junction box,
    three horizontally spaced depending insulators secured to the crosspiece of said inverted U-shaped support,
    metallic terminals for the conductors of said three phase cable at the lower end of said insulators,
    end panel members detachably secured to said end frame and end plate members,
    said panel members detachably secured to said end frame and end plate members,
    a removable cover member closing the upper end of said junction box, and gasketing means for providing an airtight seal at the joints of the adjacent edges of said members.

References Cited

UNITED STATES PATENTS 1,955,287   4/1934   Graves et al. _____ 317—103 X

LEWIS H. MYERS, *Primary Examiner.*

D. A. TONE, *Assistant Examiner.*

U.S. Cl. X.R.

317—103, 120